United States Patent [19]

Saba et al.

[11] Patent Number: 5,191,041
[45] Date of Patent: Mar. 2, 1993

[54] CATALYST FOR OLEFINIC HYDROCARBON POLYMERIZATION AND PROCESS AND PRODUCING OLEFINIC HYDROCARBON POLYMER

[75] Inventors: Hayato Saba; Keisaku Yamamoto, both of Chiba; Akio Imai, Osaka; Kiyoyuki Sugimori; Kizuku Wakatsuki, both of Chiba, all of Japan

[73] Assignee: Sumitomo Chemical Co., Ltd., Osaka, Japan

[21] Appl. No.: 821,037

[22] Filed: Jan. 16, 1992

Related U.S. Application Data

[62] Division of Ser. No. 675,823, Mar. 27, 1991, Pat. No. 5,122,493.

[30] Foreign Application Priority Data

Mar. 29, 1990 [JP] Japan .................. 2-084526
Jan. 25, 1991 [JP] Japan .................. 3-7627

[51] Int. Cl.$^5$ .................. C08F 4/631; C08F 210/16
[52] U.S. Cl. .................. 526/142; 526/348; 526/282
[58] Field of Search .................. 526/142

[56] References Cited

U.S. PATENT DOCUMENTS

| | | | |
|---|---|---|---|
| 3,455,974 | 7/1969 | Su .................. | 526/169.2 |
| 3,457,244 | 7/1969 | Fukuda et al. .................. | 526/142 |
| 3,506,629 | 4/1970 | van den Berg et al. .................. | 526/142 |
| 4,435,519 | 3/1984 | Veazy et al. .................. | 526/129 |
| 4,554,333 | 11/1985 | Coleman et al. . | |
| 4,622,409 | 11/1986 | Coleman et al. . | |
| 4,695,557 | 9/1987 | Suzuki et al. . | |
| 4,845,067 | 7/1989 | Kao et al. . | |

FOREIGN PATENT DOCUMENTS

0197685 10/1986 European Pat. Off. .
59-100105 6/1984 Japan .

OTHER PUBLICATIONS

Patent Abstracts of Japan, vol. 10, No. 144, (C-349)(2201) May 27, 1986.

*Primary Examiner*—Edward J. Smith
*Attorney, Agent, or Firm*—Sughrue, Mion, Zinn, Macpeak & Seas

[57] ABSTRACT

An inert hydrocarbon solvent-soluble catalyst for polymerization of olefinic hydrocarbons and a process for producing an olefinic polymer using the same are disclosed, the catalyst being composed of (A) a reaction product obtained by reacting (a) at least one vanadium compound represented by formula:

$$VO(OR)_m X_{3-m}$$

wherein R represents a hydrocarbon group; X represents a halogen atom; and m represents a real number of from 0 to 3, and (b) a dihydroxy hydrocarbon compound constituted of a straight chain hydrocarbon skeleton containing from 2 to 12 carbon atoms and having a hydroxyl group at each of both terminals thereof and at least one hydrocarbon branch bonded to said hydrocarbon skeleton in an inert hydrocarbon solvent at an (a) to (b) molar ratio of from 1:0.5 to 1:1.4 and (B) at least one organoaluminum compound represented by formula:

$$R'_n AlX'_{3-n}$$

wherein R′ represents a hydrocarbon group; X′ represents a halogen atom; and n represents a real number more than 0 and less than 3. Olefinic hydrocarbon polymers having narrow distributions of molecular weight and composition can be produced with high efficiency and high polymerization activity without being accompanied by obstruction or contamination of equipment due to precipitation of a catalyst.

4 Claims, No Drawings

CATALYST FOR OLEFINIC HYDROCARBON POLYMERIZATION AND PROCESS AND PRODUCING OLEFINIC HYDROCARBON POLYMER

This is a divisional of application Ser. No. 07/675,823 filed Mar. 27, 1991 now U.S. Pat. No. 5,122,493.

FIELD OF THE INVENTION

This invention relates to a catalyst for polymerization of olefinic hydrocarbons and to a process for producing olefinic hydrocarbon polymers using the catalyst.

According to the present invention, olefinic hydrocarbon polymers having a very narrow molecular weight distribution or olefinic hydrocarbon polymers having a very narrow molecular weight distribution and a very narrow composition distribution can be produced efficiently.

BACKGROUND OF THE INVENTION

Various catalysts for polymerization to obtain olefinic hydrocarbon polymers have been proposed to date. Among them, widely employed catalysts soluble in inert hydrocarbon solvents are Ziegler catalysts composed of a vanadium compound and an organoaluminum compound. Known vanadium compounds typically include halogen compounds, alkoxy compounds, and acetylacetonate complexes. Olefin polymers obtained by using general Ziegler catalysts, however, have broad distributions of molecular weight and composition and therefore have poor transparency and are tacky, which are unsuitable for use as films or resin modifiers. For use in these applications, olefin polymers should have narrow distributions of molecular weight and composition.

There have been made several proposals as to a solution polymerization technique for obtaining olefin polymers having narrow molecular weight and composition distributions by using a vanadium-containing catalyst. For example, JP-B-62-45244 (the term "JP-B" as used herein means an "examined published Japanese patent application") discloses a process comprising undergoing polymerization at a relatively low temperature by using an organic solvent-soluble vanadium compound and an organoaluminum compound. According to the process, however, most of the polymerization active species formed by the reaction between the vanadium compound and the organoaluminum compound become insoluble in a polymerization solvent, and polymerization activity achieved is lower than in processes wherein a vanadium compound and an organoaluminum compound are not brought into contact with each other.

JP-A-59-140209 (the term "JP-A" as used herein means an "unexamined published Japanese patent application") discloses a process in which a trihalogenated vanadium compound which is suitable for polymerization of olefinic hydrocarbons and insoluble in organic solvents is solubilized by reacting with an oxygen-containing electron donor. According to this process, the reaction of the trihalogenated vanadium compound and an oxygen-containing electron donor should be conducted at a relatively high temperature of about 100° C. and, moreover, equipment for carrying out this reaction is required in addition to equipment for polymerization reaction.

Some of halogen-containing compounds generally known as a polymerization activator make it feasible to produce olefin polymers having narrow distributions of molecular weight and composition. Such compounds include perchlorocrotonic acid esters and $\alpha,\alpha$-dichlorophenylacetic acid esters. However, decomposition products of these halogen-containing compounds remain in polymers obtained, causing coloration or an odor.

JP-A-61-4708 teaches use of a reaction product formed between an alcohol having only one hydroxyl group in the molecule thereof and a vanadium compound having a specific structure as a catalyst. However, since polymers obtained by using such a catalyst have a relatively broad distribution of molecular weight, the process disclosed is not suitable to achieve the purpose of obtaining a narrow molecular weight distribution.

It is known that an amorphous olefin copolymer having a very narrow molecular weight distribution can be obtained by using a reaction product formed between an $\alpha,\gamma$-diketone having two oxygen atoms in the molecule thereof and a vanadium compound as reported, e.g., in Makromol. Chem., Rapid Commun., Vol. 8, p. 285 (1987). However, there is an industrial problem in that achievement of a narrow molecular weight distribution by this technique requires temperature control at minus several tens of degree C.

Further, JP-A-59-100105 discloses a process for carrying out polymerization in a gaseous phase or in a slurry state by using a catalyst-on-carrier containing a reaction mixture of a dihydroxy hydrocarbon compound and a vanadium compound. Where this catalyst is applied to solution polymerization, the resulting polymer has a broad molecular weight distribution and, besides, the catalyst tends to form a precipitate which clogs an apparatus for catalyst feeding and adheres to the inner wall of a polymerization vessel, causing great inconvenience in industrial production.

SUMMARY OF THE INVENTION

An object of the present invention is to overcome the above-mentioned problems associated with conventional techniques for production of olefin polymers.

That is, a first object of the present invention is to provide an inert organic solvent-soluble catalyst for polymerization of olefinic hydrocarbons which produces an olefinic hydrocarbon polymer having narrow distributions of molecular weight and composition with high efficiency without causing obstruction or contamination of equipment.

A second object of the present invention is to provide a process for producing an olefinic hydrocarbon polymer using such a catalyst.

The inventors have conducted extensive and intensive investigations and, as a result, reached the present invention.

The present invention relates to an inert hydrocarbon solvent-soluble catalyst for polymerization of olefinic hydrocarbons, which is composed of (A) a reaction product obtained by reacting (a) at least one vanadium compound represented by formula:

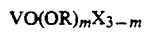

wherein R represents a hydrocarbon group; X represents a halogen atom; and m represents a real number of from 0 to 3, and (b) a dihydroxy hydrocarbon compound constituted of a straight chain hydrocarbon skeleton containing from 2 to 12 carbon atoms and having a hydroxyl group at each of both terminals thereof and at least one hydrocarbon branch bonded to said hydrocarbon skeleton in an inert hydrocarbon solvent at an (a) to (b) molar ratio of from 1:0.5 to 1:1.4 and (B) at least one organoaluminum compound represented by formula:

wherein R' represents a hydrocarbon group; X' represents a halogen atom; and n represents a real number more than 0 and less than 3.

The present invention further relates to a process for producing an olefinic hydrocarbon polymer which comprises polymerizing an α-olefin, copolymerizing an α-olefin and ethylene or a polyene compound, or copolymerizing an α-olefin, ethylene, and a polyene compound, in a solution in the presence of the above-described catalyst.

DETAILED DESCRIPTION OF THE INVENTION

Catalyst component (A) is a reaction product obtained by mixing and reacting compound (a) and compound (b) in an inert hydrocarbon solvent at an (a) to (b) molar ratio of from 1:0.5 to 1:1.4.

Compound (a) comprises at least one vanadium compound represented by formula (I):

$$VO(OR)_m X_{3-m}$$

In formula (I), R represents a hydrocarbon group, preferably an aliphatic hydrocarbon group, and more preferably a saturated aliphatic hydrocarbon group, e.g., methyl, ethyl, n-propyl, isopropyl, n-butyl, isobutyl, sec-butyl, t-butyl, phenyl, and benzyl groups.

m is a real number of from 0 to 3. From the standpoint of obtaining a narrow molecular weight distribution, m preferably represents 0.

X is a halogen atom, e.g., chlorine, fluorine, bromine, and iodine atoms. From the standpoint of solubility in a solvent, X preferably represents a chlorine or bromine atom.

Specific examples of compound (a) are $VOCl_3$, $VO(OCH_3)Cl_2$, $VO(OCH_3)_2Cl$, $VO(OCH_3)_3$, $VO(OC_2H_5)Cl_2$, $VO(OC_2H_5)_2Cl$, $VO(OC_2H_5)_3$, $VO(O\text{-}n\text{-}C_3H_7)Cl_2$, $VO(O\text{-}n\text{-}C_3H_7)_2Cl$, $VO(O\text{-}n\text{-}C_3H_7)_3$, $VO(O\text{-}i\text{-}C_3H_7)Cl_2$, $VO(O\text{-}i\text{-}C_3H_7)_2Cl$, $VO(O\text{-}i\text{-}C_3H_7)_3$, $VO(O\text{-}n\text{-}C_4H_9)Cl_2$, $VO(O\text{-}n\text{-}C_4H_9)_2Cl$, $VO(O\text{-}n\text{-}C_4H_9)_3$, $VO(O\text{-}i\text{-}C_4H_9)Cl_2$, $VO(O\text{-}i\text{-}C_4H_9)_2Cl$, $VO(O\text{-}i\text{-}C_4H_9)_3$, $VO(O\text{-}s\text{-}C_4H_9)Cl_2$, $VO(O\text{-}s\text{-}C_4H_9)_2Cl$, $VO(O\text{-}s\text{-}C_4H_9)_3$, $VO(O\text{-}t\text{-}C_4H_9)Cl_2$, $VO(O\text{-}t\text{-}C_4H_9)_2Cl$, $VO(O\text{-}t\text{-}C_4H_9)_3$, $VO(O\text{-}Ph)Cl_2$, $VO(O\text{-}Ph)_2Cl$, $VO(O\text{-}Ph)_3$, $VO(OCH_2\text{-}Ph)Cl_2$, $VO(OCH_2\text{-}Ph)_2Cl$, and $VO(OCH_2\text{-}Ph)_3$, wherein n- indicates normal; i- indicates iso-; s- indicates secondary; t- indicates tertiary; and Ph represents a phenyl group; and these compounds whose Cl atom(s) is(are) displaced with Br, I, or F atom(s).

These compounds may be used either individually or in combination of two or more thereof.

Compound (b) is a dihydroxy hydrocarbon compound composed of a straight chain hydrocarbon skeleton (preferably a saturated hydrocarbon) having a hydroxyl group at each of both terminals thereof and at least one hydrocarbon branch (preferably a saturated hydrocarbon) bonded to said hydrocarbon skeleton, the hydrocarbon skeleton containing from 2 to 12 carbon atoms. At least one hydrocarbon branch is preferably bonded to a carbon atom adjacent to the carbon atom bonded to a hydroxyl group. The hydrocarbon branch preferably contains two or more carbon atoms. With these preferred conditions being satisfied, the catalyst of the present invention exhibits particularly high activity.

If a dihydroxy hydrocarbon compound having no hydrocarbon branch is used as compound (b), the catalyst has extremely low polymerization activity, though capable of producing a polymer having a narrow molecular weight distribution. Besides, such a catalyst is generally poor in solubility in hydrocarbon solvents so that it forms a precipitate to cause adhesion to the wall of a reaction vessel or obstruction of the equipment. In addition, polymerization activity is instable due to change of the precipitate in amount. These disadvantages are very inconvenient in industrially carrying out the production. Should the precipitate be fed to a polymerization vessel, it would become a nucleus which tends to lead to abnormal polymerization to produce an insoluble polymer gel as a result. If a polymer containing such a gel is used as films or resin modifiers, final products obtained would have deteriorated surface properties and reduced physical properties attributed to the polymer gel. Moreover, the polymer gel contains a vanadium compound. It follows that the final products contain the vanadium compound and thus have reduced quality. From all these considerations, dihydroxy hydrocarbon compounds having no hydrocarbon branch are unsuitable as compound (b).

Specific examples of compound (b) are 2-ethyl-1,3-propanediol, 2-propyl-1,3-propanediol, 2-butyl-1,3-propanediol, 2-pentyl-1,3-propanediol, 2,2-diethyl-1,3-propanediol, 2,2-dimethylolpentane, 2-n-butyl-2-ethyl-1,3-propanediol, 1,2-butanediol, 1,3-butanediol, 2,3-butanediol, 2,5-dimethyl-2,5-hexanediol, 2,4-dimethyl-2,4-pentanediol, 1,2-dodecanediol, 2-ethyl-1,33-hexanediol, 1,2-hexanediol, 2,5-hexanediol, 2,2,4-trimethyl-1,3-pentanediol, 4-ethyl-1,7-heptanediol, 1,2-cyclohexyldiol, 2-methyl-2,4-pentanediol, 2,4-pentanediol, and 1-phenyl-1,2-ethanediol.

These compounds may be used either individually or in combinations of two or more thereof.

In view of efficiency in deashing and washing after polymerization, compound (b) preferably has a solubility of 10 mg/100 ml or more in water at room temperature. Compound (b) having too low solubility would be incorporated into a product and cause tackiness when the product is used as a film or deteriorate surface properties, such as printability and coating properties, when the product is used as a film or a resin modifier, or would cause an odor.

Component (A) is a reaction product obtained by mixing and reacting compounds (a) and (b) at an (a) to (b) molar ratio of from 1:0.5 to 1:1.4.

The reaction of compounds (a) and (b) generates no substantial heat of reaction and, therefore, the reaction system needs neither cooling nor heating and sufficiently completes reaction at room temperature. Accordingly, the reaction temperature is not particularly limited, but preferably ranges from −20° to 70° C. from the viewpoint of controllability of the reaction system. The reaction time required is usually several minutes or more, and preferably about 1 hour or more.

From the standpoint of obtaining a polymer having a molecular weight distribution as narrow as possible, a reaction molar ratio of compound (a) to compound (b)

is from 1:0.5 to 1.4, more preferably from 1:0.8 to 1:1.2, and most preferably 1:1.

Component (B) is an organoaluminum compound represented by formula (II):

$$R'_n AlX'_{3-n} \quad \text{(II)}$$

In formula (II); R' represents a hydrocarbon group, preferably an aliphatic hydrocarbon group, and more preferably a saturated aliphatic hydrocarbon group, e.g., methyl, ethyl, n-propyl, n-butyl, and isobutyl groups.

X' represents a halogen atom, e.g., chlorine, fluorine, bromine and iodine atoms, and preferably a chlorine or bromine atom.

n is a real number greater than 0 and smaller than 3, and preferably 2 or smaller. From the viewpoint of obtaining a high molecular weight, a narrow molecular weight distribution, and high activity, n is preferably from 1.2 to 1.8.

As stated above, component (B) essentially contains a halogen atom. Otherwise, no polymerization activity is exhibited.

Specific examples of component (B) include $(CH_3)_2AlCl$, $(CH_3)_{1.5}AlCl_{1.5}$, $CH_3AlCl_2$, $(C_2H_5)_2AlCl$, $(C_2H_5)_{1.5}AlCl_{1.5}$, $C_2H_5AlCl_2$, $(n-C_3H_7)_2AlCl$, $(n-C_3H_7)_{1.5}AlCl_{1.5}$, $n-C_3H_7AlCl_2$, $(n-C_4H_9)_2AlCl$, $(n-C_4H_9)_{1.5}AlCl_{1.5}$, $n-C_4H_9AlCl_2$, $(i-C_4H_9)_2AlCl$, $(i-C_4H_9)_{1.5}AlCl_{1.5}$, and $i-C_4H_9AlCl_2$; and these compounds whose Cl atom(s) is(are) displaced with F, Br, or I atom(s).

These compounds as component (B) may be used either individually or in combination of two or more thereof.

Component (B) may further contain, in addition to the above-mentioned compounds, an aluminum halide, e.g., aluminum chloride, aluminum bromide, and aluminum iodide; or a trialkylaluminum, e.g., triethylaluminum.

The catalyst for polymerization of olefinic hydrocarbons according to the present invention is composed of components (A) and (B). Methods for mixing components (A) and (B) or methods for using these catalyst components are not particularly restricted. For example, components (A) and (B) may be mixed to prepare a catalyst before polymerization is conducted; or components (A) and (B) may be separately fed to a polymerization system containing a monomer or a monomer mixture. In general, the latter mode is desirable for obtaining higher catalyst activity.

A ratio of component (A) to component (B) is not particularly critical. A preferred (A) to (B) molar ratio is in the range of from 1:2 to 1:500, and particularly from 1:3 to 1:200. Taking a unit for polymer production and ease of deashing into consideration, the (A) to (B) molar ratio is preferably not more than 1:20.

The thus obtained catalyst according to the present invention is soluble in inert hydrocarbon solvents, which constitutes one of features of the present invention. Such a soluble catalyst causes no obstruction or contamination of equipment while exhibiting its full activity, thus offering a great convenience in industrial production.

While the polymerization catalyst of the present invention is applicable to polymerization of a wide range of olefinic hydrocarbons, it is particularly effective in polymerization of an α-olefin, copolymerization of ethylene and an α-olefin or a polyene compound, and copolymerization of ethylene, an α-olefin, and a polyene compound.

α-Olefins which can be used in the present invention are those represented by formula, $CH_2=CH.R''$, wherein R'' represents a hydrocarbon group having from 1 to 20 carbon atoms, preferably those having from 1 to 10 carbon atoms, and more preferably those having from 1 to 4 carbon atoms. Specific examples include propylene, butene-1, pentene-1, 3-methyl-butene-1, hexene-1, 3-methyl-pentene-1, 4-methyl-pentene-1, heptene-1, decene-1, and vinylcyclopentane. In particular, lower alkenes, e.g., propylene and butene-1, are suited to be polymerized to produce polymers having a sufficiently high molecular weight for practical use with relative ease. In the process of the present invention, an α-olefin containing from 3 to 12 carbon atoms can be used.

Polyene compounds which can be polymerized according to the present invention include conjugated diene compounds, e.g., isoprene and piperylene; and non-conjugated polyene compounds, such as bridged ring hydrocarbon compounds, monocyclic compounds, heterocyclic compounds, acyclic compounds, and spiro-compound, with the latter non-conjugated compounds being preferred because the former have large polymerization inhibitory properties. Specific examples of the non-conjugated polyene compounds are dicyclopentadiene, 5-methylene-2-norbornene, 5-ethylidene-2-norbornene, 5-isopropylidene-2-norbornene, 5-isopropenyl-2-norbornene, cyclooctadiene, 6-methyl-4,7,8,9-tetrahydroindene, 1,4-hexadiene, and 1,6-octadiene. In particular, the catalyst of the present invention satisfactorily catalyzes polymerization of aliphatic diene compounds which have been considered poor in copolymerizability. Use of these polyene compounds leads to production of sulfur-vulcanizable rubbery products.

The process of polymerization using the catalyst of the present invention will be explained below in detail.

The order of addition of the catalyst and monomers is not particularly limited and can be selected arbitrarily. Generally speaking, higher catalyst activity can be achieved, as stated above, when components (A) and (B) are separately added to a polymerization system in the presence of monomers than in using a previously prepared mixture of components (A) and (B).

Where, in particular, a polyene compound is used as a comonomer, it may be previously dissolved in a reaction medium or may be fed to a reaction system as a mixture of other monomers either continuously or intermittently.

Hydrocarbon solvents are used for both the reaction of compounds (a) and (b) and the polymerization reaction. Usable hydrocarbon solvents include aliphatic hydrocarbons, e.g., pentane, hexane, heptane, octane, and kerosine; alicyclic hydrocarbons, e.g., cyclohexane; and aromatic hydrocarbons, e.g., benzene, toluene, and xylene. These hydrocarbon solvents may be used either individually or in combination thereof. Aromatic hydrocarbons are not recommended in spite of their satisfactory capability of dissolving the catalyst because they are slightly reactive with component (B) and, if remain in the final product, possess carcinogenicity or give off a strong smell. It is also possible to use a polymerization monomer in excess to serve as a reaction solvent.

In the present invention, a molecular weight of a polymer can easily be controlled by, for example, introducing hydrogen as a chain transfer agent to the reaction system. In most cases, use of a chain transfer agent does not result in broad distributions of molecular weight and composition and rather brings about favorable results of narrowing the distributions.

The polymerization reaction is preferably carried out at a temperature of from 0° to 100° C., and more preferably from 20° to 80° C., under a pressure of from 5 to 50 kg/cm².

If in using compound (a) alone or a conventional polymerization catalyst system composed of an organoaluminum compound and a so-called vanadate compound obtained by reacting compound (a) with a monohydroxy hydrocarbon compound, the resulting polymer has a broad molecular weight distribution, failing to accomplish the object of the present invention. Further, where a catalyst containing the above-described vanadate compound is used, there is sometimes produced a polymer having two or more peaks in the molecular weight distribution. Where more than one monomer are copolymerized by using such a catalyst, the resulting copolymer often has a monomer composition dependent on the molecular weight probably because a plurality of polymerization active species exist.

The reason why polymers of narrow molecular weight distribution can be obtained, on the contrary, as long as the polymerization catalyst of the present invention is employed has not yet been made clear, but it would be safe to assume that the reaction product (component (A)) of the vanadium compound (compound (a)) and the dihydroxy hydrocarbon compound (compound (b)) has such a structure that facilitates formation of a single polymerization active species, thus preventing unfavorable side reactions.

The present invention is now illustrated in greater detail with reference to Examples and Comparative Examples, but it should be understood that the present invention is not deemed to be limited thereto.

In these examples, a molecular weight distribution and a composition distribution of polymers obtained were evaluated from a ratio of weight average molecular weight (Mw) to number average molecular weight (Mn) (Mw/Mn) and a room temperature hexane-insoluble content (HIP), respectively. The smaller Mw/Mn or HIP, the narrower the molecular weight distribution or composition distribution, respectively.

EXAMPLES 1A AND 1B

Preparation of Component (A)

In a 100 ml four-necked flask equipped with a stirrer, a thermometer, a reflux condenser, and a dropping funnel whose atmosphere had been displaced with nitrogen, 417 mg (4 mmole) of 2-ethyl-1,3-propanediol as compound (b) and 20 ml of hexane were charged. Then, 20 ml of a hexane solution of 690 mg (4 mmole) of vanadyl trichloride as compound (a) was added thereto, and the mixture was allowed to react at room temperature for 6 hours in a nitrogen stream. After the reaction, hexane was added in the amount dissipated by vaporization.

Polymerization Reaction

One liter of hexane was charged in a 2 l flask. The flask was placed in a thermostat kept at 30° C., and a mixed gas consisting of 40 mole % of ethylene and 60 mole % of propylene was fed at a rate of 10 Nl/min to saturate the flask. To the solution were added 0.8 mmole of ethylaluminum sesquichloride ($(C_2H_5)_{1.5}AlCl_{1.5}$) as component (B) and 0.1 mmole (reduced to vanadium) of component (A) prepared above in this order. Then, ethylene and propylene were blown into the system for 20 minutes with stirring.

To the resulting reaction mixture was added 40 ml of methanol to stop the reaction. The reaction mixture was poured into 4 l of methanol to precipitate the polymer produced, and the collected precipitate was dried in vacuo to obtain a white amorphous solid polymer. The resulting polymer was evaluated in terms of (1) polymerization activity, (2) HIP, (3) Mw, (4) Mw/Mn; (5) molecular weight distribution (number of peaks), and (6) propylene content. The results obtained are shown in Table 1 below.

TABLE 1

| Example No. | Catalyst Component | Polymerization Activity (gP/mmoleV) | HIP | Mw (×10⁴) | Mw/Mn | Number of Mol. Wt. Peaks | Propylene Content (wt %) |
|---|---|---|---|---|---|---|---|
| 1A | (a) VOCl₃ (b) 2-ethyl-1,3-propanediol (B) (C₂H₅)₁.₅AlCl₁.₅ | 160 | none | 67 | 2.0 | 1 | 36.8 |
| 1B* | (a) VOCl₃ (b) 2-ethyl-1,3-propanediol (B) (C₂H₅)₁.₅AlCl₁.₅ | 130 | none | 30 | 2.1 | 1 | 34.7 |

Note: The asterisk * indicates that hydrogen was mixed with a monomer mixed gas and fed at a rate of 1 Nl/min (hereinafter the same).

EXAMPLES 2A TO 2J

The same procedures of Example 1A were repeated, except for changing the 2-ethyl-1,3-propanediol used as compound (b) as shown in Table 2 below. The results of evaluations are also shown in Table 2.

TABLE 2

| Example No. | Catalyst Component (b) | Polymerization Activity (gP/mmoleV) | HIP | Mw (×10⁴) | Mw/Mn | Number of Mol. Wt. Peaks | Propylene Content (wt %) |
|---|---|---|---|---|---|---|---|
| 2A | 2-butyl-1,3-propanediol | 160 | none | 56 | 2.2 | 1 | 37.7 |
| 2B* | " | 160 | none | 24 | 2.2 | 1 | 35.2 |
| 2C | 2-pentyl-1,3-propanediol | 160 | none | 61 | 2.0 | 1 | 37.6 |
| 2D* | " | 150 | none | 29 | 2.1 | 1 | 34.4 |
| 2E | 2,2-diethyl-1,3-propanediol | 110 | none | 54 | 2.2 | 1 | 36.0 |
| 2F* | " | 110 | none | 30 | 2.1 | 1 | 33.5 |
| 2G | 2-ethyl-1,3-hexanediol | 110 | none | 70 | 2.0 | 1 | 32.9 |
| 2H* | " | 100 | none | 30 | 2.0 | 1 | 32.4 |
| 2I | 1,2-dodecanediol | 170 | none | 67 | 2.3 | 1 | 39.5 |
| 2J* | " | 160 | none | 23 | 2.1 | 1 | 37.0 |

COMPARATIVE EXAMPLE 1

The same procedures of Example IA were repeated, except for using no compound (b). The results of evaluations are as follows.

Polymerization Activity: 110 gP/mmoleV
HIP: detected
Mw: $51 \times 10^4$
Mw/Mn: 4.5
Number of Mol. Wt. Peaks: 1
Propylene Content: 47.8 wt %

The catalyst used is one of conventional catalysts commonly employed for homogeneous solution polymerization. It can be seen from the results that the polymer obtained had a broad molecular weight distribution.

COMPARATIVE EXAMPLES 2A TO 2F

The same procedures of Example 1A were repeated, except for using a dihydroxy hydrocarbon compound having no hydrocarbon branch as compound (b), which is out of the scope of the present invention. During the preparation of catalysts, a precipitate was formed. The precipitate was removed by filtration before use except in Comparative Example 2F. The results of evaluations are shown in Table 3 below.

In these comparative examples, preparation of catalysts was attended by formation of a caramel-like or slurry-like precipitate, which adhered to the inner wall of the reaction vessel and stirring blades. The molecular weight distribution of the resulting polymers was substantially equal to that of the polymer obtained in Example IA, but the polymerization activity proved lower. Further, in Comparative Examples 2C and 2E, a trace of the catalyst precipitate remained in the polymer layer and became nuclei around which a hexane-insoluble matter was formed.

EXAMPLES 3A TO 3C AND COMPARATIVE EXAMPLES 3A TO 3E

The same procedures as in Example 2A were repeated, except that $VOCl_3$ as compound (a) was replaced with the compound shown in Table 4 below and, in comparative examples, no compound (b) was used. The results of evaluations are shown in Table 4.

TABLE 4

| Example No. | Catalyst Component (a) | Polymerization Activity (gP/mmoleV) | HIP | Mw ($\times 10^4$) | Mw/Mn | Number of Mol. Wt. Peaks | Propylene Content (wt %) |
|---|---|---|---|---|---|---|---|
| Example 3A | $VO(O\text{-}i\text{-}Pr)Cl_2$ | 120 | none | 40 | 2.4 | 1 | 34.1 |
| Example 3B | $VO(O\text{-}i\text{-}Pr)_2Cl$ | 160 | none | 42 | 2.7 | 1 | 35.7 |
| Example 3C | $VO(O\text{-}i\text{-}Pr)_3$ | 140 | none | 39 | 2.6 | 1 | 33.7 |
| Comparative Example 3A | $VO(O\text{-}i\text{-}Pr)Cl_2$ | 150 | none | 72 | 6.4 | 2 | 37.9 |
| Comparative Example 3B | $VO(O\text{-}i\text{-}Pr)_2Cl$ | 130 | none | 62 | 4.7 | 2 | 33.3 |
| Comparative Example 3C | $VO(O\text{-}i\text{-}Pr)_3$ | 110 | none | 45 | 4.9 | 2 | 32.0 |
| Comparative Example 3D | $VO(O\text{-}n\text{-}Bu)_3$ | 130 | none | 38 | 4.2 | 2 | 43.8 |
| Comparative Example 3E | $VO(O\text{-}t\text{-}Bu)_3$ | 100 | none | 74 | 8.6 | 2 | 37.5 | i-Pr: $i\text{-}C_3H_7$, n-Bu: $n\text{-}C_4H_9$, t-Bu: $t\text{-}C_4H_9$

The polymers of comparative examples had a broad molecular weight distribution having two peaks.

EXAMPLE 4 AND COMPARATIVE EXAMPLES 4A TO 4C

The same procedures as in Example 1A were repeated, except for using the compound (b) and component (B) shown in Table 5 below. The results of evaluations are also shown in Table 5.

TABLE 3

| Compar. Example No. | Catalyst Component (b) | Polymerization Activity (gP/mmoleV) | HIP | Mw ($\times 10^4$) | Mw/Mn | Number of Mol. Wt. Peaks | Propylene Content (wt %) |
|---|---|---|---|---|---|---|---|
| 2A | propylene glycol | 50 | none | 82 | 2.2 | 1 | 36.2 |
| 2B* | " | 50 | none | 36 | 2.2 | 1 | 36.0 |
| 2C | 1,4-butanediol | 40 | detected | 66 | 2.3 | 1 | 37.4 |
| 2D* | " | 40 | none | 33 | 2.3 | 1 | 36.5 |
| 2E | 1,6-hexanediol | 40 | detected | 66 | 2.2 | 1 | 35.3 |
| 2F | 1,12-dodecanediol | The catalyst was used without removal of the precipitate. As a result, a pipe for feeding a catalyst was obstructed, failing to perform polymerization. | | | | | |

TABLE 5

| Example No. | Catalyst Components | Polymeriztion Activity (gP/mmoleV) | HIP | Mw ($\times 10^4$) | Mw/Mn | Number of Mol. Wt. Peaks | Propylene Content (wt %) |
|---|---|---|---|---|---|---|---|
| Example 4 | (b) 2-pentyl-1,3-propanediol (B) $C_2H_5AlCl_2$ | 80 | none | 38 | 2.3 | 1 | 37.3 |
| Comparative Example 4A | (b) not used (B) $C_2H_5AlCl_2$ | 50 | none | 158 | 16.0 | 2 | 34.2 |
| Comparative Example 4B | (b) 2-pentyl-1,3-propanediol (B) $(C_2H_5)_3Al$ | Polymerization did not proceed. | | | | | |
| Comparative Example 4C | (b) 1,6-hexanediol (B) $(C_2H_5)_3Al$ | Polymerization did not proceed. | | | | | |

The catalyst of Comparative Example 4A containing no compound (b) had low polymerization activity, and the resulting polymer had a broad molecular weight distribution. The catalysts of Comparative Examples 4B and 4C prepared by using component (B) containing no halogen atom had no polymerization activity.

EXAMPLES 5A AND 5B AND COMPARATIVE EXAMPLE 5

The same procedures as in Example 2C were repeated, except for changing the (a) to (b) molar ratio as shown in Table 6 below. The results of evaluations are shown in Table 6.

TABLE 6

| Example No. | (a)/(b) Molar Ratio | Polymerization Activity (gP/mmoleV) | HIP | Mw ($\times 10^4$) | Mw/Mn | Number of Mol. Wt. Peaks | Propylene Content (wt %) |
|---|---|---|---|---|---|---|---|
| Example 5A | 1/0.5 | 120 | none | 54 | 2.7 | 1 | 39.2 |
| Example 5B | 1/1.3 | 160 | none | 43 | 2.5 | 1 | 33.9 |
| Compartive Example 5 | 1/2.0 | 180 | none | 41 | 17.0 | 2 | 37.0 |

The polymer of Comparative Example 5 in which the (a) to (b) molar ratio is out of the present invention had a broad molecular weight distribution having two peaks.

EXAMPLE 6

The same procedures as in Example 2G were repeated, except that the reaction time of compounds (a) and (b) was reduced to 10 minutes. The results of evaluations are as follows.
Polymerization Activity: 100 gP/mmoleV
HIP: none
Mw: $70 \times 10^4$
Mw/Mn: 2.4
Number of Mol. Wt. Peaks: 1
Propylene Content: 32.9 wt %

EXAMPLE 7

The same procedures as in Example 2D were repeated, except that the monomer mixed gas consisted of 45 mole% of ethylene and 55 mole % of propylene. The results of evaluations are as follows.
Polymerization Activity: 140 gP/mmoleV
HIP: none
Mw: $129 \times 10^4$
Mw/Mn: 2.4
Number of Mol. Wt. Peaks: 1
Propylene Content: 30.4 w %

EXAMPLE 8 AND COMPARATIVE EXAMPLE 8

The same procedures as in Example 2C were repeated, except for using ethylene, propylene, and ethylidenenorbornene as monomers (7.1 mmole of ethylidenenorbornene per liter of hexane) and, in Comparative Example 8, no component (b) was used. The results of evaluations are shown in Table 7 below.

The catalyst of Comparative Example 8 was poor in polymerization activity, and the resulting polymer had a broad molecular weight distribution and a small content of ethylidenenorbornene.

COMPARATIVE EXAMPLE 9

The same procedures as in Example 1A were repeated, except for using tris(2-methyl-1,3-butanedionate)vanadium as compound (a), $(C_2H_5)_2AlCl$ as component (B), and using no compound (b). The results of evaluations were as follows.
Polymerization Activity: 110 gP/mmoleV
HIP: detected
Mw: $69 \times 10^4$
Mw/Mn: 12.8
Number of Mol. Wt. Peaks: 2
Propylene Content: 41.7 wt %

It can be seen that the resulting polymer had a broad molecular weight distribution having two peaks.

As described and demonstrated above, the present invention provides a catalyst and a process for producing an olefinic hydrocarbon polymer with great industrial advantages. According to the process, olefinic hydrocarbon polymers having narrow distributions of molecular weight and composition can be produced with high efficiency. The catalyst of the present invention exhibits high polymerization activity without causing obstruction or contamination of equipment due to precipitation.

While the invention has been described in detail and with reference to specific examples thereof, it will be apparent to one skilled in the art that various changes and modifications can be made therein without departing from the spirit and scope thereof.

What is claimed is:

1. A process for producing an olefinic hydrocarbon polymer comprising copolymerizing an α-olefin containing from 3 to 12 carbon atoms and ethylene, or an α-olefin containing from 3 to 12 carbon atoms, ethylene, and a polyene compound, in an inert solvent in the presence of an inert hydrocarbon solvent-soluble catalyst consisting of (A) a reaction product obtained by reacting (a) at least one vanadium compound represented by formula:

$$VO(OR)_m X_{3-m}$$

wherein R represents a hydrocarbon group; X represents a halogen atom; and m represents a real number of

TABLE 7

| Example No. | Catalyst Component | Polymerization Activity (gP/mmoleV) | HIP | Mw ($\times 10^4$) | Mw/Mn | Number of Mol. Wt. Peaks | Propylene Content (wt %) |
|---|---|---|---|---|---|---|---|
| Example 8 | (a) VOCl$_3$ (b) 2-pentyl-1,3-propanediol (B) (C$_2$H$_5$)$_{1.5}$AlCl$_{1.5}$ | 110 Iodine value = 16.0 | none | 51 | 2.6 | 1 | 35.4 |
| Comparative Example 8 | (a) VOCl$_3$ (b) not used (B) (C$_2$H$_5$)$_{1.5}$AlCl$_{1.5}$ | 65 Iodine value = 4.4 | none | 68 | 5.6 | 1 | 35.8 | from 0 to 3, and (b) a dihydroxy hydrocarbon compound constituted of a straight chain hydrocarbon skeleton containing from 2 to 12 carbon atoms and having a hydroxyl group at each of both terminals thereof and at least one hydrocarbon branch bonded to said hydrocarbon skeleton in an inert hydrocarbon solvent at an (a) to (b) molar ratio of from 1:0.5 to 1:1.4 and (B) at least one organoaluminum compound represented by formula:

$$R_{n'}AlX_{3-n'}$$

wherein R' represents a hydrocarbon group; X' represents a halogen atom; and n represents a real number more than 0 and less than 2.

2. A process as claimed in claim 1, wherein an (A) to (B) molar ratio is from 1:2 to 1:500.

3. A process as claimed in claim 1, wherein said α-olefin contains from 3 to 6 carbon atoms.

4. A process as claimed in claim 1, wherein said polyene compound is a non-conjugated diene compound.

* * * * *